(12) United States Patent
Boucher (10) Patent No.: US 7,861,361 B2
(45) Date of Patent: Jan. 4, 2011

(54) SNOW REMOVAL DEVICE AND KIT

(76) Inventor: Laura Boucher, 4 Hunter Dr., Epping, NH (US) 03042

( * ) Notice: Subject to any disclaimer, the term of this patent is extended or adjusted under 35 U.S.C. 154(b) by 764 days.

(21) Appl. No.: 11/906,485

(22) Filed: Oct. 1, 2007

(65) Prior Publication Data
US 2009/0083926 A1 Apr. 2, 2009

(51) Int. Cl.
*A47L 1/00* (2006.01)
(52) U.S. Cl. .......................... 15/220.1; 15/160; 15/227; 15/236.02
(58) Field of Classification Search ........... 15/111, 15/117, 160, 22.1, 227, 236.02; 2/16, 160, 2/20, 161.6
See application file for complete search history.

(56) References Cited
U.S. PATENT DOCUMENTS
2,856,621 A * 10/1958 Racicot ........................ 15/105
4,538,320 A * 9/1985 Batt .......................... 15/236.02
4,748,711 A * 6/1988 Markus ...................... 15/227
5,729,857 A * 3/1998 Martin et al. ................ 15/111

* cited by examiner

*Primary Examiner*—Shay L Karls
(74) *Attorney, Agent, or Firm*—Michael J. Persson; Lawson & Persson, PC (57) ABSTRACT

A snow removal device and kit that include a first sheet, a second sheet, and at least one strap. The top and bottom edges of the first sheet are joined to the top and bottom edges of the second sheet and the second sheet is also joined to the first sheet such that unjoined portions of the first sheet and the second sheet form an arm pocket and a weight pocket. The arm pocket is formed proximate to the joined top edges of the first sheet and the second sheet and is dimensioned to accommodate an arm of a user. The weight pocket is dimensioned to accommodate at least one weight and includes at least three closed edges. The strap is attached proximate to the joined top and bottom edges of one side edge.

20 Claims, 8 Drawing Sheets

SNOW REMOVAL DEVICE AND KIT

FIELD OF THE INVENTION

The present invention relates to the field of snow removal and, in particular, to devices for removing snow from vehicles.

BACKGROUND OF THE INVENTION

Snow falls in a large portion of the United States during the winter months of each year. When this snow falls for a prolonged period of time, it accumulates on vehicles and must be removed before the vehicle may be moved. In fact, it some states now require snow to be cleared from tops of vehicles in order to prevent sheets of snow or ice from blowing off and causing accidents and/or damage to other vehicles.

A large number of devices have been developed for removing snow and ice from an automobile. One of the most common snow removal devices is an ice scraper having a protruding blade. Such prior art devices are exemplified by U.S. Pat. No. 4,748,711 to Markus, entitled "Ice/Snow Scraping System"; and U.S. Pat. No. 4,538,320 to Batt entitled "Scraper With Mitt". Each of these scrapers contains a plastic blade that is designed to remove snow and ice from the glass window surfaces of an automobile. Unfortunately, the exterior of an automobile also includes a number of surfaces, such as painted metal, plated metal and plastic, which are very susceptible to scratching and conventional scrapers cannot be used to remove snow and ice from the other surfaces of the automobile because hard plastic blades can damage those scratch susceptible surfaces.

The need to remove snow from scratch susceptible surfaces of a vehicle is problematic, as snow must be removed from the vehicle in a manner that does not damage these surfaces. One solution is to simply use a scraper to remove snow from the windows of the vehicle. However, if the snow is not removed from the hood of the automobile, the snow may blow against the windshield when the automobile is driven, thereby blinding the driver. Similarly, if the snow is not removed from the roof of an automobile, then the snow can fall off of the roof covering the rear window of the automobile. In certain situations, snow and ice that have not been removed from an automobile may fly off of the automobile while the automobile is being driven, thereby creating a danger to other automobiles on the road. Accordingly, leaving this snow on the vehicle is not a viable option.

One common solution used by people remove snow from the surfaces of their automobile is to use a floor broom to push or pull the snow from the hood and roof of the vehicle. However, the bristles of a floor broom are hard and the broom can easily scratch many surfaces of the automobile if it is not used carefully. Another common technique used to remove snow from the top of an automobile is to pass a person's arm over the snow covered surfaces of the automobile. Besides the scratching hazard from zippers, buttons and the like, such a prior art technique is not preferred because the clothes and hand of the driver tend to become wet and cold.

A number of specialized devices have been developed to assist a driver in removing snow from all surfaces of an automobile without damaging the surface finish on the automobile and without requiring the driver to get wet. Such prior art devices are exemplified by U.S. Pat. No. 2,856,621, entitled "Scraper and squeegee device for clearing windows of snow and ice". This patent discloses a long stick having a conventional hard blade scraper at one end and a broom with soft bristles at the opposite end. The scraper end of the stick is used to remove snow from glass windows while the broom end is used to remove snow from the other scratch susceptible surfaces.

This device allows the user to remove light snow from the vehicle without damaging the scratch susceptible surfaces thereof. However, a problem associated with snow removal devices like that of this patent is that the broom bristles are made very soft and the broom end of the device does not displace much snow as it is wiped across the surface of the automobile. As a result, it takes a very long time to remove snow from an automobile with such a device. Furthermore, if the snow is wet or is packed, then the bristles are incapable of displacing the snow, thereby making such a device ineffective and the user must then resort to using his/her hand to remove the snow.

Another device for removing snow from a vehicle is disclosed in U.S. Pat. No. 5,729,857, entitled "Device for removing snow and ice from the glass and painted surfaces of an automobile". This patent discloses a snow removal device that includes a mitt element that receives a person's hand and a portion of the arm to a point in between the elbow and the shoulder. The mitt element is affixed to the rear surface of a plow structure and the combination of the mitt element and the plow structure combine to retain a person's arm in a manner that prevents the arm from bending at the elbow. The plow structure has a substantially planar front surface that displaces snow as it moves across the top surfaces of an automobile and the bottom of the plow structure is configured so that is can conform to the changing contours of the automobile without scratching the finished surface thereof.

The device disclosed in this patent is effective at removing snow from the hood or trunk portion of a vehicle. However, it is not readily adapted to removing snow from the roof portions of larger vehicles, such as trucks and sport utility vehicles that are popular today. Further, the user must lean up against the vehicle in order to pull the snow off of the hood and trunk, causing the user's body to become covered with snow. Finally, this device is only adapted to removing snow from a portion of hood or trunk of the vehicle and is not adapted to removing snow from the entire hood or trunk in a single pass. In the case of an individual cleaning one or two cars, it may be acceptable to spend this time to move from one side of the vehicle to the other. However, in the case of vehicle dealerships, vehicle rental facilities, valet parking facilities, and the like, this drawback tends to double the time required to remove snow from the vehicles.

Therefore, there is a need for a device for removing snow from a vehicle that will not damage scratch susceptible surfaces of the vehicle, does not result in the clothes and hand of the user becoming wet and cold, is capable of quickly removing heavy wet snow, is capable of easily removing snow from the roof surfaces of large vehicles, such as trucks and sport utility vehicles, and that may be adapted to remove snow from an entire vehicle in a single pass.

SUMMARY OF THE INVENTION

The present invention is a snow removal device and kit that overcome the drawbacks inherent in the prior art. In its most basic form, the snow removal device includes a first sheet, a second sheet, and at least one strap. The first sheet has a front surface and a back surface defined by a top edge, a bottom edge, a first side edge and a second side edge. The second sheet has a front surface and a back surface defined by a top edge, a bottom edge, a first side edge and a second side edge. The top edge, bottom edge, first side edge and second side edge of the first sheet are aligned with the top edge, bottom edge, first side edge and second side edge of the second sheet, the top edge of the first sheet is joined to the top edge of the second sheet, the bottom edge of the first sheet is joined to the bottom edge of the second sheet, and the second sheet is also joined to the first sheet such that unjoined portions of the first sheet and the second sheet form an arm pocket and a weight pocket. The arm pocket is formed proximate to the joined top edges of the first sheet and the second sheet and is dimensioned to accommodate an arm of a user. The weight pocket is dimensioned to accommodate at least one weight and includes at least three closed edges. The strap includes a first end and a second end and the first end of the strap is attached to the first sheet and the second sheet proximate to the joined top edges and the first side edge, and the second end of the strap is attached to the first sheet and the second sheet proximate to the joined bottom edges and the first side edge.

The preferred snow removal device also includes at least one weight disposed within the weight pocket. The weight preferably includes a weight band having three weight compartments and at least one pound of a weighting material in each of the three weight compartments. In some embodiments, the weight band has a substantially triangular cross sectional shape and a narrow edge of the weight band is disposed proximate to the joined bottom edges of the first sheet and the second sheet. In other embodiments, the weight is a sealed bladder filled with a liquid material.

The preferred embodiment of the snow removal device includes at least two straps, each having a first end and a second end. The first end of the first strap is attached to the first sheet and the second sheet proximate to the joined top edges and the first side edge, and the second end of the first strap is attached to the first sheet and the second sheet proximate to the joined bottom edges and the first side edge. The first end of the second strap is attached to the first sheet and the second sheet proximate to the joined top edges and the second side edge, and the second end of the second strap is attached to the first sheet and the second sheet proximate to the joined bottom edges and the second side edge.

The preferred snow removal device also includes at least four attachment members. In this embodiment, one attachment member is attached to the first sheet and the second sheet proximate to the joined top edges and the first side edge, one is attached to the first sheet and the second sheet proximate to the joined top edges and the second side edge, one is attached to the first sheet and the second sheet proximate to the joined bottom edges and the first side edge, and one is attached to the first sheet and the second sheet proximate to the joined bottom edges and the second side edge. In these embodiments, at least one of the first end and the second end of the first strap is removably attached to one of the at least four attachment members, and at least one of the first end and the second end of the second strap is removably attached to one of the at least four attachment members.

In the preferred embodiment of snow removal device, the first sheet and the second sheet are manufactured of a water resistant fabric that will not scratch painted surfaces of the vehicle. This material is preferably a vinyl impregnated polyester yarn includes a plurality of openings therethrough. The preferred device also includes a plurality of reinforcing bands. In such embodiments, one reinforcing band is preferably joined to the first sheet and the second sheet proximate to the top edges, one reinforcing band is preferably joined to the first sheet and the second sheet proximate to the bottom edges, and one reinforcing band is preferably joined to the first sheet and the second sheet between the arm pocket and the weight pocket.

If a single person is using the device, the person will preferably insert one arm into the arm pocket, grab one of the straps with the other arm and move the device across the vehicle. The weight in the weight pocket forces the devices against the vehicle and effectively clears the snow therefrom. The user will then reposition the device on the other side of the vehicle and repeat the process. However, if the user does not wish to use the arm pocket, or if the surface to be cleared is too high for the user to reach, the user may position the device on the surface and use the straps to pull the device across the vehicle. When two people are available to remove snow, each user will stand on an opposite side of the vehicle and grasp one of the straps. The users will then walk along the length of the vehicle, pulling the device over the vehicle and removing the snow from one side thereof. They will then position the device on the other side of the vehicle and repeat the process.

A preferred embodiment of the snow removal kit includes a first snow removal device and a second snow removal device, a first strap, a second strap and joining means for removably joining the attachment members attached proximate to the second edge of the first snow removal device to the attachment members attached proximate to the first edge of the second snow removal device. In such embodiments, the kit may be assembled by joining the attachment members attached proximate to the second edge of the first snow removal device to the attachment members attached proximate to the first edge of the second snow removal device using the joining means, attaching the first clip member of the first strap to the attachment member attached proximate to the top edge and the first edge of the first snow removal device, attaching the second clip member of the first strap to the attachment member attached proximate to the bottom edge and the first edge of the first snow removal device, attaching the first clip member of the second strap to the attachment member attached proximate to the top edge and the second edge of the second snow removal device, and attaching the second clip member of the second strap to the attachment member attached proximate to the bottom edge and the second edge of the second snow removal device.

In some embodiments of the kit, the joining means is integrated into at least one of the first snow removal device and the second snow removal device includes a first hook and loop fastener and a second hook and loop fastener. In such embodiments, the first hook and look fastener includes a first portion that is attached to the joined top edge of the first sheet and the second sheet of one snow removal device proximate to one of the at least four attachment members and extends beyond the first side edge, and a second portion that is attached to the joined top edge of the first sheet and the second sheet between the ring and the second side edge. The second hook and look fastener includes a first portion that is attached to the joined bottom edge of the first sheet and the second sheet of one snow removal device proximate to one of the at least four attachment members and extends beyond the first side edge, and a second portion that is attached to the joined bottom edge of the first sheet and the second sheet between the ring and the second side edge. The first portion of the first hook and loop fastener is of a length sufficient to allow the first portion of the first hook and loop fastener to pass through the attachment means attached proximate to the joined top edge of the other snow removal device and to mate with the second portion of the first hook and look fastener. Finally, the first portion of the second hook and loop fastener is of a length sufficient to allow the first portion of the second hook and loop fastener to pass through the attachment means attached proximate to the joined bottom edge and to mate with the second portion of the second hook and look fastener In other embodiments of the kit, the joining means includes a first carabiner and a second carabiner.

Some embodiments of the snow removal kit also include at least one extension strap. The preferred extension strap has a first end and a second end is dimensioned to pass through the first strap and the second strap and includes attachment means for attaching extension strap to at least one the first strap and the second strap.

The preferred snow removal kit also includes a carrying pouch, the carrying pouch is manufactured of a water resistant material and is dimensioned to accommodate the first snow removal device, the second snow removal device, the first strap, the second strap and the joining means.

Another preferred group of embodiments of the snow removal kit includes a snow removal device, a first strap, a second strap, and a weight band dimensioned for disposal within the weight pocket of the snow removal device. It is preferred that such embodiments include at least one extension strap having a first end and a second end. The extension strap is preferrably dimensioned to pass through the first strap and the second strap and comprises attachment means for attaching the extension strap to at least one of the first strap and the second strap. Finally, it is preferred that these embodiments of the kit include joining means for joining the snow removal device to another snow removal device.

In embodiments of the device that are manufactured to allow two or more devices to be joined together in order to allow a full vehicle to be cleared in one pass, two devices will be joined together and the each user will stand on an opposite side of the vehicle and grasp one of the straps. The users will then walk along the length of the vehicle, pulling the device over the vehicle and removing the snow thereof. In others embodiments, the device is of a width sufficient to cover the entire vehicle.

Therefore, it is an aspect of the invention to provide a device for removing snow from a vehicle that will not damage scratch susceptible surfaces of the vehicle.

It is a further aspect of the invention to provide a device for removing snow from a vehicle that does not result in the clothes and hand of the user becoming wet and cold.

It is a further aspect of the invention to provide a device for removing snow from a vehicle that is capable of quickly removing heavy snow, is capable of easily removing snow from the roof surfaces of large vehicles, such as trucks and sport utility vehicles.

It is a further aspect of the invention to provide a device for removing snow from a vehicle that and that may be adapted to remove snow from an entire vehicle in a single pass.

It is a further aspect of the invention to provide a device for removing snow from a vehicle that allows two people to work in tandem.

It is a further aspect of the invention to provide a device for removing snow from a vehicle that is manufactured in modular units to accommodate single users, multiple users and different sized vehicles.

It is a further aspect of the invention to provide a device for removing snow from a vehicle that does not utilize gasoline or other pollutants and is an environmentally responsible, reusable item.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
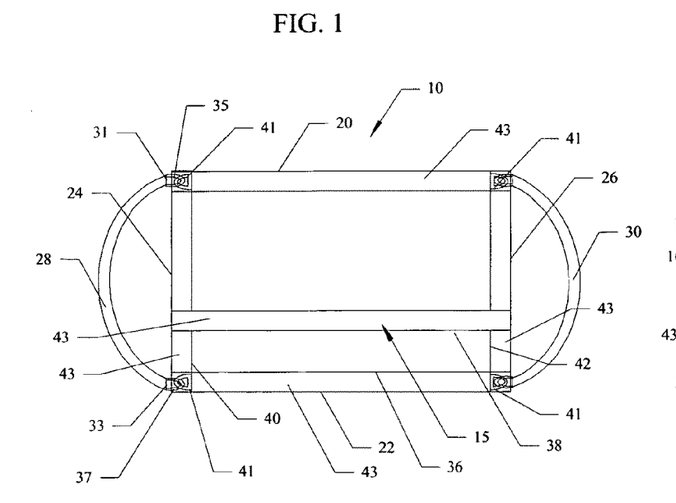
FIG. 1 is a front view of the one embodiment of the snow removal device of the present invention.
Figure 2:
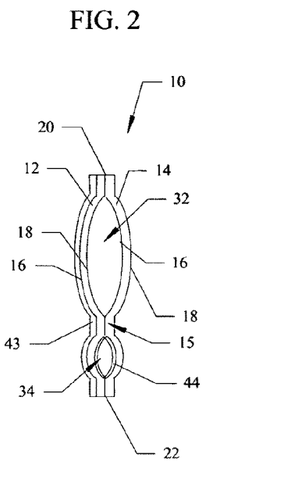
FIG. 2 is an end view of the embodiment of the snow removal device of FIG. 1 with straps, attachment means and weight omitted and with the thicknesses of the sheets and reinforcing member shown larger than actual proportions for purposes of clarity.

Referring first to FIGS. 1 and 2, one embodiment of the snow removal device 10 of the present invention is shown. The snow removal device includes a first sheet 12 and a second 14 that are substantially the same size and shape and each include a front surface 16 and a back surface 18 defined by a top edge 20, a bottom edge 22, a first side edge 24 and a second side edge 26. The sheets 12, 14 are preferably manufactured of the same material. In the preferred embodiment, the sheets 12, 14 are manufactured of a water resistant fabric that will not scratch painted surfaces of said vehicle. This fabric is preferably manufactured of a vinyl impregnated polyester yarn comprising a plurality of openings therethrough, such as the material sold under the trademark ENDURO by Hendee Enterprises of Houston, Tex. This material is preferred due to its water resistance, strength and fast drying properties. However, other materials, such as nylon, sailcloth, or the like, may be substituted to achieve similar results.

The first sheet 12 and second sheet 14 and are preferably of substantially the same size are aligned such that top edge 20, bottom edge 22, first side edge 24 and second side edge 26 of each sheet 12, 14 are aligned with the corresponding edge of the other sheet 12, 14. The top edges 20 and bottom edges 22 of each sheet 12, 14 are joined together and a central portion 15 of each sheet 12, 14 are joined together such that the unjoined portions of the first sheet 12 and second sheet 14 form an arm pocket 32 and a weight pocket 34.

Figure 5:
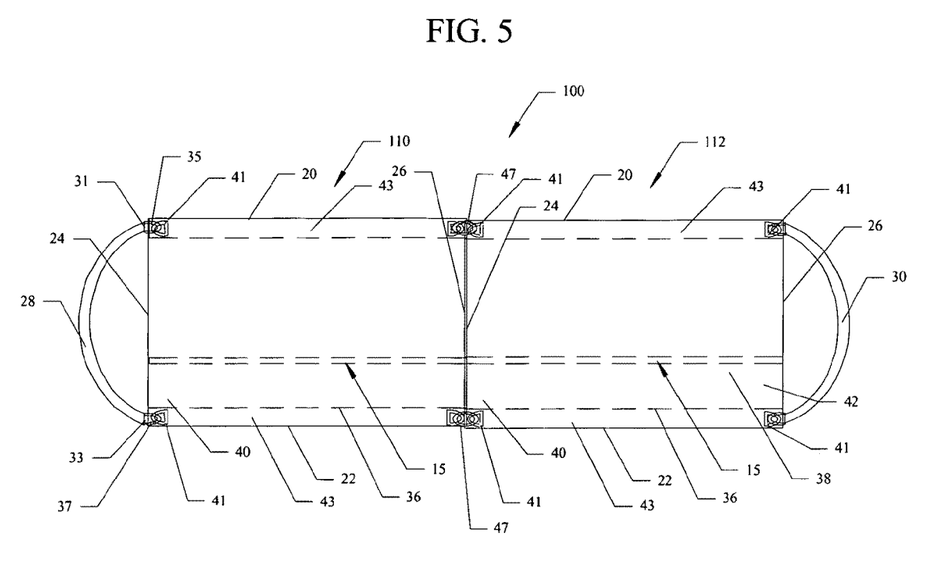
FIG. 5 is a front view of one embodiment of the snow removal kit of the present invention in which a first snow removal device and a second snow removal device are joined together.

It is preferred that a reinforcing member 43 be attached to the device 10 to impart additional strength to it. In the embodiment of FIGS. 1 and 2, the reinforcing member 43 is a two-inch wide strip of nylon webbing stitched to the front surface 16 of the first sheet 12 about its perimeter and across the central portion. However, in the preferred embodiment, the reinforcing member 43 is disposed between the first sheet 12 and second sheet 12 along the areas that are to be joined together and is attached to the first and second sheets 12, 14 when they are joined together. Snow removal devices 10 manufactured in this manner are illustrated in FIG. 5.

In the preferred embodiment, the device 10 has a width dimension of thirty three inches, measured from the first side edge 24 to the second side edge 24, and a height dimension of twenty three and one half inches measured from the top edge 20 to the bottom edge 22. This width dimension is preferred as the dimension approximates the length of an average person's arm, while the length dimension is preferred as this approximates the width of an average human arm plus the width of the preferred weight. However, other embodiments may be manufactured to different dimensions to achieve similar results. For example, double sized units having a width dimension of ninety-six inches and a height dimension of thirty two inches may be utilized for commercial applications, such as clearing automobile sales lots, car rental lots, valet parking areas, or the like. Similarly, the modularity of the units allows smaller units to be manufactured and joined together and, in some embodiments, the device 10 will have a width dimension of thirty three inches and a height dimension of twenty inches.

The arm pocket 32 is formed proximate to the joined top edges 20 and is dimensioned to accommodate an arm of a user. In the preferred embodiment, the arm pocket 34 has a height of approximately eleven and one half inches. The first side edge 24 and the second side edge 26 of the arm pocket 32 are preferably open, with the first sheet 12 and second sheet 14 remaining unjoined along the width defining the arm pocket 32. This is preferred as it allows the arm pocket to be accessed from either the first side edge 24 or the second side edge 26. However, in other embodiments, the first side edge 24 and second side edge 26 each include a closure (not shown), such as a hook and loop fastener, which allows the edge to be removably sealed. In still others, one or the other of the first side edge 24 and second side edge 26 are permanently sealed, by stitching or other means. In such embodiments, the user will position the first sheet 12 against the vehicle to remove snow from one side and position the second sheet 14 against the vehicle to remove snow from the other side.

The weight pocket 34 is dimensioned to accommodate at least one weight, such as the weight bands 50, 60 shown in FIGS. 3 and 4 respectively, and includes at least three closed edges 36, 38, 40. In the preferred embodiment, the arm pocket 34 has a height of approximately six inches. In the embodiment of FIGS. 1 and 2, one edge 42 is left open to allow the weight to be inserted. In this embodiment, the open edge 42 includes a closure 44, preferably a hook and loop fastener, which allows the open end 42 to be removably sealed once the weight is inserted therein. In the preferred embodiment, the weight or weights will not be sold as part of the snow removal device 10. This is preferred as weighting material, such as sand, is readily available and the inclusion of weights will add to the costs of shipping the device 10 and will limit the manner in which the device 10 may be displayed. In the preferred embodiment, a separate weight band is provided and is adapted to be filled and sealed before being inserted into the weight pocket. However, in other embodiments the weight pocket 34 is configured to produce a water-tight seal once the weighting material is inserted therein and, therefore, is adapted to be filled with a weighting material, such as sand. However, in still other embodiments, the weighting material is disposed within the weight pocket 34, sealed therein at the factory, and is sold as part of the device 10.

The snow removal device 10 includes at least one, and preferably two, straps 28, 30. These straps 28, 30 are preferably manufactured of a nylon fabric webbing and each have a first end 31 and a second end 33. The preferred straps 28, 30 have a length of approximately forty-eight inches and a width of approximately two inches. This length is preferred as longer straps tend to interfere with the snow removal process when the user utilizes the arm pocket 32 to assist in the removal, while shorter straps are not as effective when a single user wishes to use the device 10 to remove snow from the roof of a larger vehicle. Similarly, this width is preferred due to its ready availability, strength and the good gripping power that it provides. However, it is recognized that straps having different dimensions may be substituted in alternative embodiments.

In some embodiments the straps 28, 30 are permanently attached to the device 10, such as by sewing. However, in the preferred embodiment, the straps 28, 30 each include a first clip member 35 and a second clip member 37 that are dimensioned to removably attach the straps 28, 30 to attachment members 41 that are fixedly attached to the device 10 proximate to each corner. The clip members 35, 37 are preferably durable plastic clips such as are commonly used in connection with luggage straps, or are carabiner type clips, such as those used by climbers. Regardless of what form the clip members 35, 37 take, they must be sufficiently durable to withstand the weight of heavy snow being pulled by the device 10 and must be dimensioned to attach to the attachment members 41.

Figure 6A:
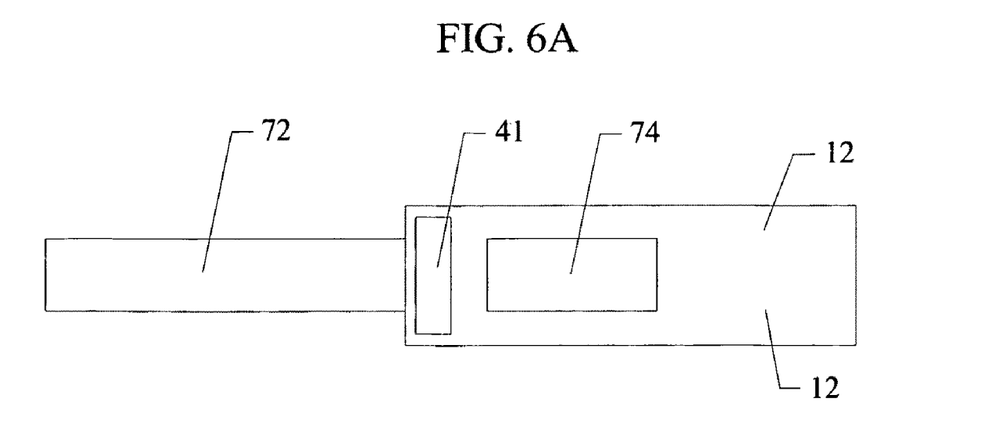
FIG. 6A is a partial front view of an alternative embodiment of the kit in which hook and loop fasteners are used to join the first snow removal device to the second snow removal device.
Figure 6B:
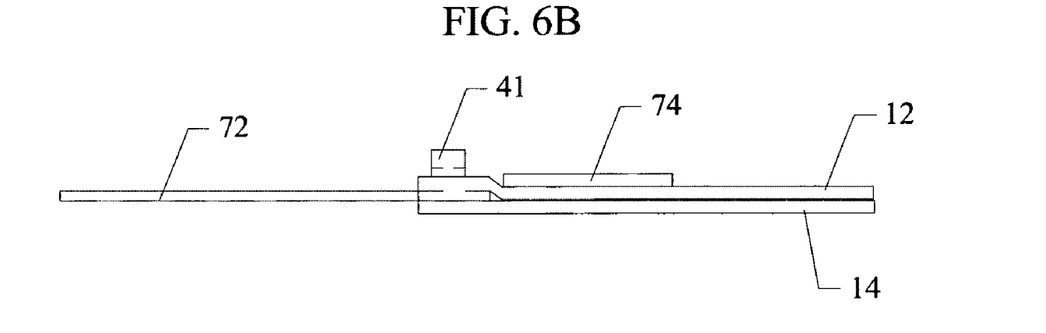
FIG. 6B is a partial top view of the alternative embodiment of the kit of FIG. 6A.
Figure 6C:
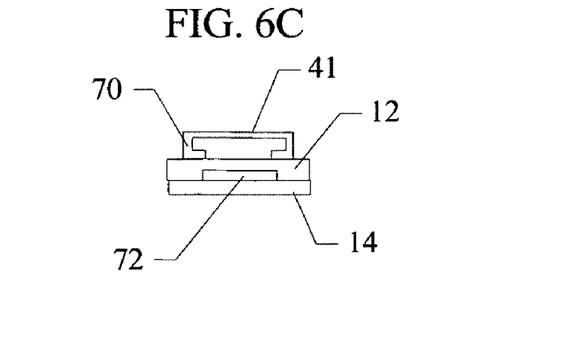
FIG. 6C is a partial side view of the alternative embodiment of the kit of FIGS. 6A and 6B.

The attachment members 41 are preferably the plastic "D" shaped rings shown in FIGS. 1 and 5. However, other embodiments utilized different attachments members 41. For example, as shown in FIGS. 6A-6C, the attachment member may take the form of a loop of material 70, such as nylon webbing, that is sewn or otherwise joined to the first and second sheets 12, 14. In other embodiments, the attachment member 41 is a reinforced opening (not shown) through the first and second sheets 12, 14 that is dimensioned to allow an end 31, 33 of the strap 28, 30 to pass therethrough. In such embodiments, the ends 31, 33 of the straps 28, include clip members 35, 37 that are adapted to attach to the strap 28, 30 itself the end 31, 33 is passed through the reinforced opening. Although these attachment members 41 have been discussed herein, those of ordinary skill in the art will readily recognize other attachment members 41 that will achieve the desired result and, accordingly, the attachment members 41 should not be limited to those exemplary members described herein.

Regardless of the form that they take, the attachment members 41 are preferably permanently attached to the first sheet 12 and the second sheet 14 proximate to each corner. It is preferred that the attachment members 41 shown in FIGS. 1 and 5 be located such that they do not extend beyond the perimeter of the sheets 12, 14. This location is preferred as it reduces the risk that the plastic material of the preferred attachment members 41 will scratch the vehicle. However, in other embodiments, such as those utilizing attachment members 41 manufactured of fabric or other scratch resistant materials, the attachment members 41 may extend beyond the perimeter of the sheets 12, 14.

In the preferred embodiment, the first strap 28 is attached to the first sheet 12 and second sheet 14 such that the first end 31 is attached to the attachment member 41 located proximate to the top edge 20 and said first side edge 24 and the second end 33 is attached to the attachment member 41 located proximate to the bottom edge 22 and said first side edge 24. Similarly, the second strap 28 is attached to the first sheet 12 and second sheet 14 such that the first end 31 is attached to the attachment member 41 located proximate to the top edge 20 and said second side edge 26 and the second end 33 is attached to the attachment member 41 located proximate to the bottom edge 22 and said second side edge 26. In this manner, each strap 28, 30 is attached along one side edge 24, 26 and may be pulled therefrom by a user.

Figure 3A:
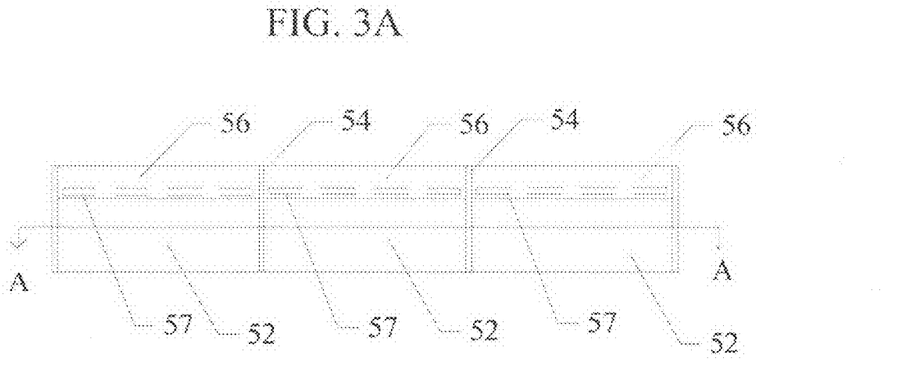
FIG. 3A is a front view of one embodiment of a weight band for insertion within the weight pocket of the snow removal device and kit of the present invention.
Figure 3B:
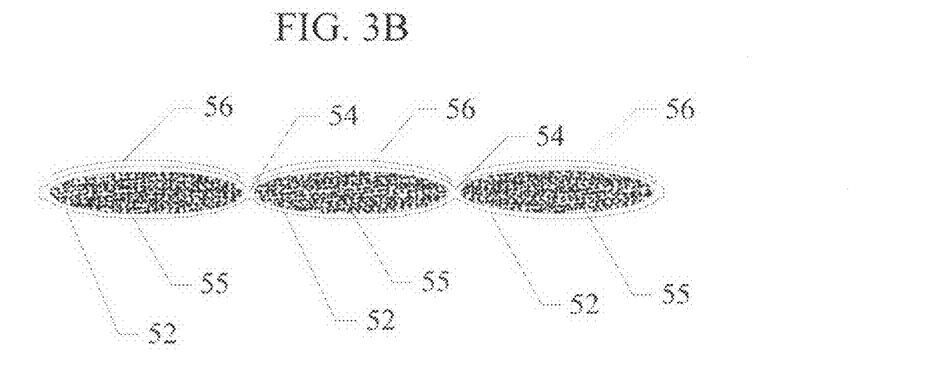
FIG. 3B is a cross sectional view of the weight band of FIG. 3A cut along ling A-A.

Referring now to FIGS. 3A and 3B, it is preferred that the device 10 include a weight band 50 that is inserted within the weight pocket 34. The preferred weight band 50 includes three pockets 52 that are joined together along seams 54. The use of three separate pockets 52 is preferred as this provides the band 50 with enhanced flexibility and makes the band 50 easier to store. Each pocket 52 has an opening that is covered by a top flap 56 that may be pulled back to allow the pocket 52 to be filled with a weighting material 55. The preferred weighting material 55 is sand as it is cheap, readily available, and allows the weight band 50 to more readily conform to irregular surfaces. However, other weighting materials may be utilized to achieve similar results. For example, some embodiments utilize round metal balls, such a BB's, as their weighting material 55. Other embodiments utilized refillable water packs, which may be filled, frozen and utilized as the weighting material 55.

The top flap 56 of each pocket 52 preferably includes a means of sealing the flap to the pocket 52 once it is filled. In the embodiment of FIGS. 3A and 3B, this takes the form of the hook and loop fastener 57 shown in hidden lines below the each flap 56. However, other embodiments utilize other art recognized sealing means, such a zippers, snaps or the like. In still others, such as those in which sealed weighting material 55 is inserted therein, no means is provided for sealing the flap 56.

Figure 4A:
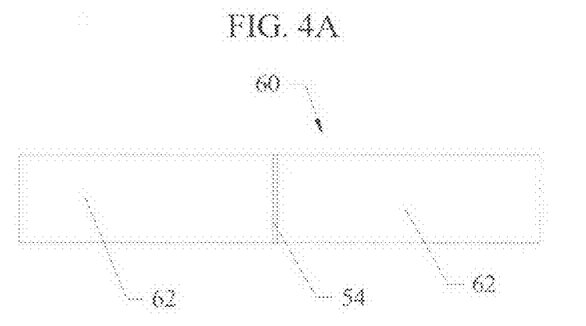
FIG. 4A is a front view of another embodiment of a weight band for insertion within the weight pocket of the snow removal device and kit of the present invention.
Figure 4B:
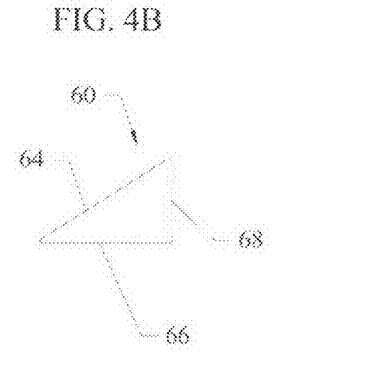
FIG. 4B is an end view of the weight band of FIG. 4A.

FIGS. 4A and 4B show an alternative embodiment of the weight band 60. In this embodiment, the weight band is filled with the weighting material (not shown) at the factory and is sealed before shipment. This eliminates the need for the flaps 56 of the embodiment of FIGS. 3A and 3B. The embodiment of FIG. 4 has a single seam 54 that forms two compartments 62 in which the weighting material is disposed. Although the bands 50, 60 of FIGS. 3 and 4 include multiple pockets and compartment, it is recognized that other embodiments utilize weight bands 50, 60 having a single long pocket 52 or compartment 62 and, therefore, the weight bands 50, 60 should not be seen as being so limited. In the embodiment of FIGS. 4A and 4B, the weight band 60 has a cross section that forms a right triangle having a top surface 64, bottom surface 66 and back surface 68. Such a cross section is preferred as it places the majority of the weight at the trailing edge and this, coupled with the ramp-like top surface 64, prevents the weight band 60 from riding up and over heavy snow.

Regardless of whether a weight band 50, 60 or other type of weight is disposed within the weight pocket 34, it is preferred that the overall weight disposed therein be at least three pounds. This is preferred because testing of the device 10 has shown that those in which weights of less than three pounds were used do not perform as well those in which at least three pounds are used. It was also found that the weights were most useful in storms in which a combination of precipitations caused a heavier more sticky snow. Where non-weighted versions of the device 10 would ride up over the piles of heavy snow, the weights allowed the device to stay in contact with the surface of the vehicle and allow all snow to be removed in a single pass. Therefore, the use of such weights is preferred.

Referring now to FIG. 5, one embodiment of the kit 100 of the present invention is shown. In this embodiment, a first snow removal device 110 and a second snow removal device 112 are joined together. The snow removal devices 110, 112 are substantially identical to those described above, except that at least one of the straps 28, 30 is removable to allow it to be attached to a device 110, 112 when a single device 110, 112 is to be utilized, and to be removed and attached to the other device 110, 112 when the two devices 110, 112 are joined together. The kit 110 also includes a means for joining the attachment members 41 along the second end 26 of the first device 110 to the attachment members 41 along the first end 24 of the second device 112. In the preferred embodiment, this joining means is a pair of carabiners 47 that are dimensioned to extend between the attachment members 41 and hold them together. The use of carabiners 47 is preferred due to their ease of use in changing when modular use is needed for extra space. However, it is recognized that other joining means may also be utilized.

An alternative joining means is shown in FIGS. 6A-6C. In this embodiment, the attachment member 41 is a loop of material 70, such as nylon webbing, that is sewn or otherwise joined to the first and second sheets 12, 14 and the joining means is hook and loop fastener made up of a first portion 72 and a second portion 74. The first portion is attached to the edge of said first sheet 12 and said second sheet 12 of proximate the attachment member 41 and extends beyond the edge. The second portion 74 is attached to disposed upon the first sheet 12 and attached to the first sheet 12 and second sheet. The first portion 74 is of a length sufficient to allow it to pass through the attachment means 41 of an adjacent snow removal device (not shown) passed through the attachment member 41 and attached to the second portion 74. Although FIGS. 6A-6C show only one corner of a snow removal device 110, 112, it is recognized that each corner of each device may be similarly equipped to allow multiple devices 110, 112 to be attached together.

In embodiments of the kit 100 utilizing a first snow removal device 110 and a second snow removal device 112, the kit 110 is assembled by joining the attachment members 41 attached proximate to the second edge 26 of the first snow removal device 110 to the attachment members 41 attached proximate to the first edge 24 of the second snow removal device 112. The first clip member 35 of the first strap 28 is attached to the attachment member 41 attached proximate to the top edge 20 and the first edge 24 of the first snow removal device 110 and the second clip member 37 of the first strap 28 is attached to the attachment member 41 attached proximate to the bottom edge 22 and the first edge 24 of the first snow removal device 112. The first clip member 35 of the second strap 30 is attached to the attachment member 41 attached proximate to the top edge 22 and second edge 26 of the second snow removal device 112, and the second clip member 37 of the second strap 30 is attached to the attachment member 41 attached proximate to the bottom edge 22 and the second edge 26 of the second snow removal device 112.

Figure 7:
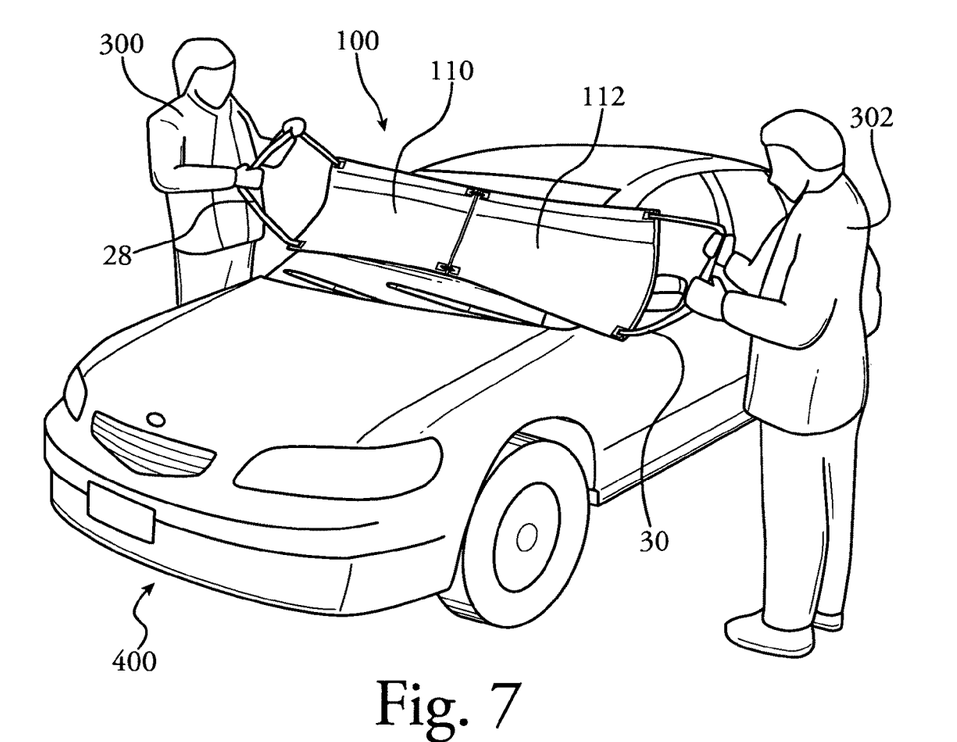
FIG. 7 is an isometric view of one embodiment of the kit in use showing two people removing snow from a vehicle.

As shown in FIG. 7, when so assembled, the kit 100 takes the form of a snow removal device having a width that is twice the width of a single device 110, 112. This is useful when two people 300, 302 are to clear snow from a vehicle 400, as one person 300 may stand on one side the vehicle 400 and grasp the first strap 20, the other person 302 can stand on the other side of the vehicle and grasp the second strap 30 and both may walk along the length of the vehicle 400 pulling the straps 22, 30 such that the entire vehicle is cleared in a single pass.

Figure 8:
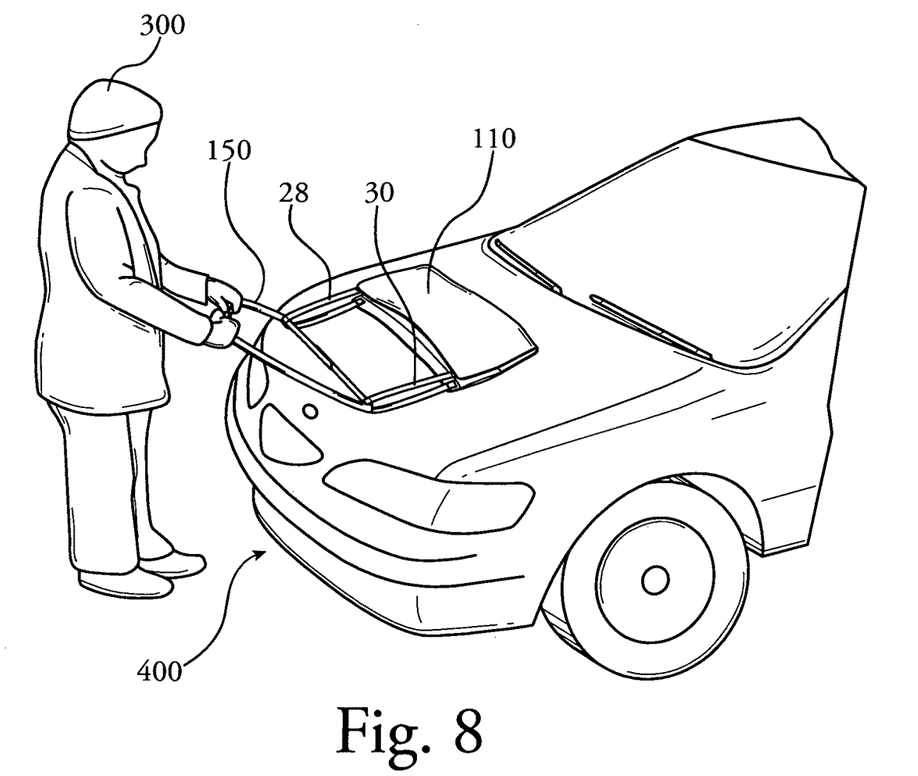
FIG. 8 is an isometric view of one embodiment of the kit in showing the use of an extension strap.
Figure 9:
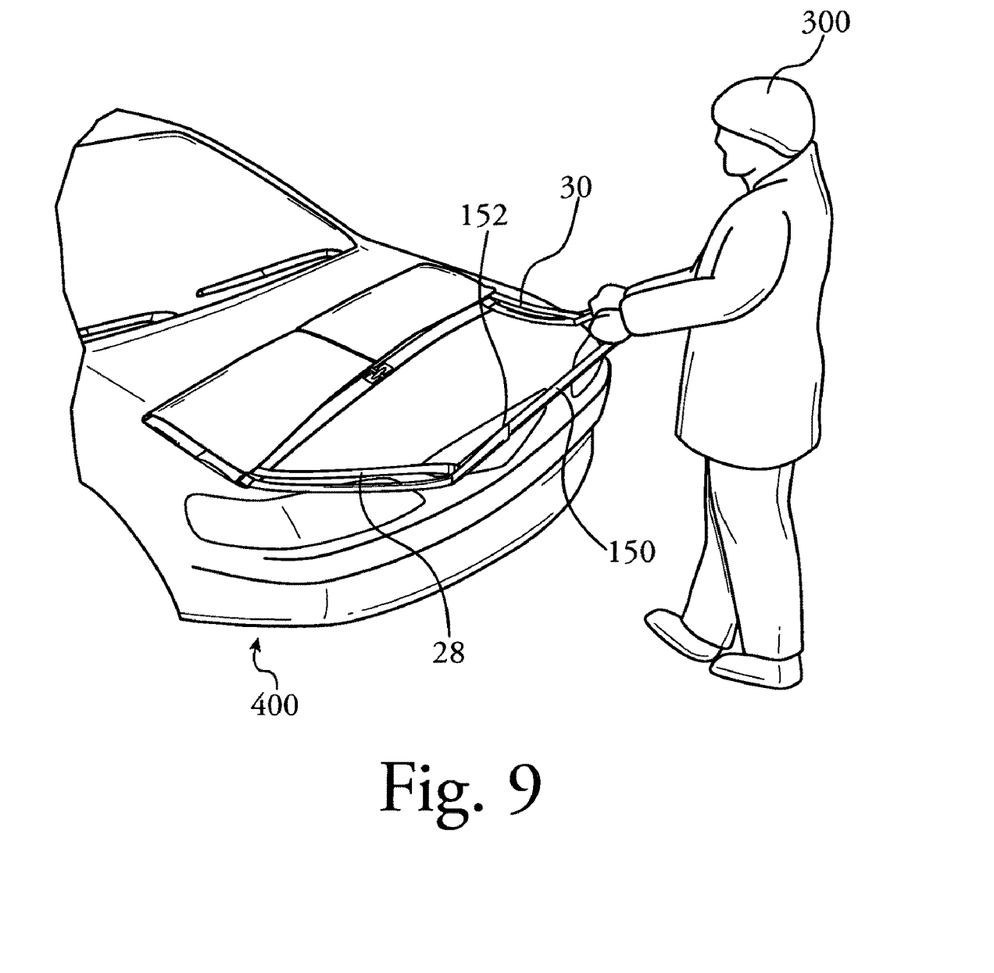
FIG. 9 is an isometric view of another embodiment of the kit in showing the use of an extension strap.
Figure 10:
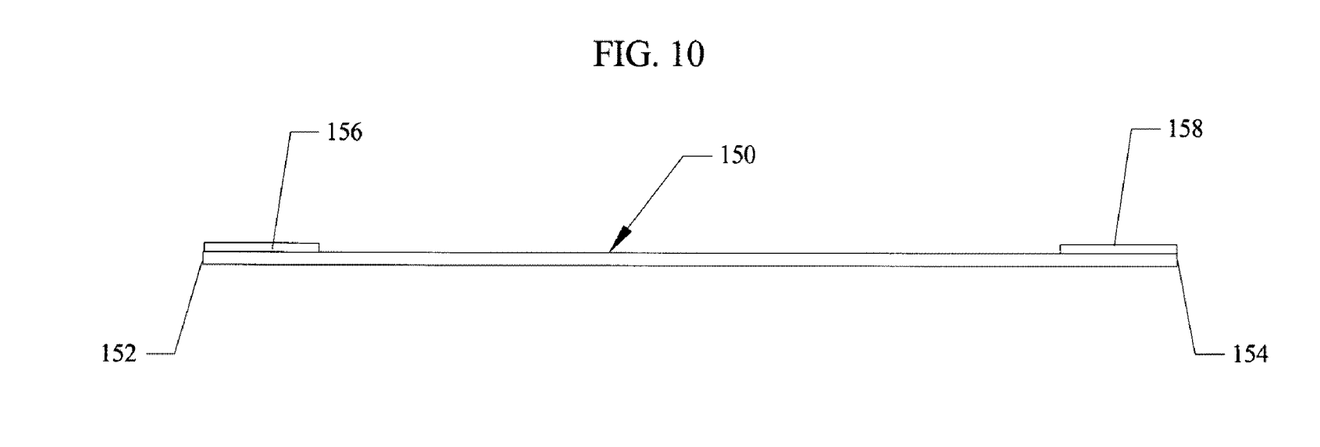
FIG. 10 is a cross sectional view of the extension strap of the kit of FIG. 8.
Figure 11:
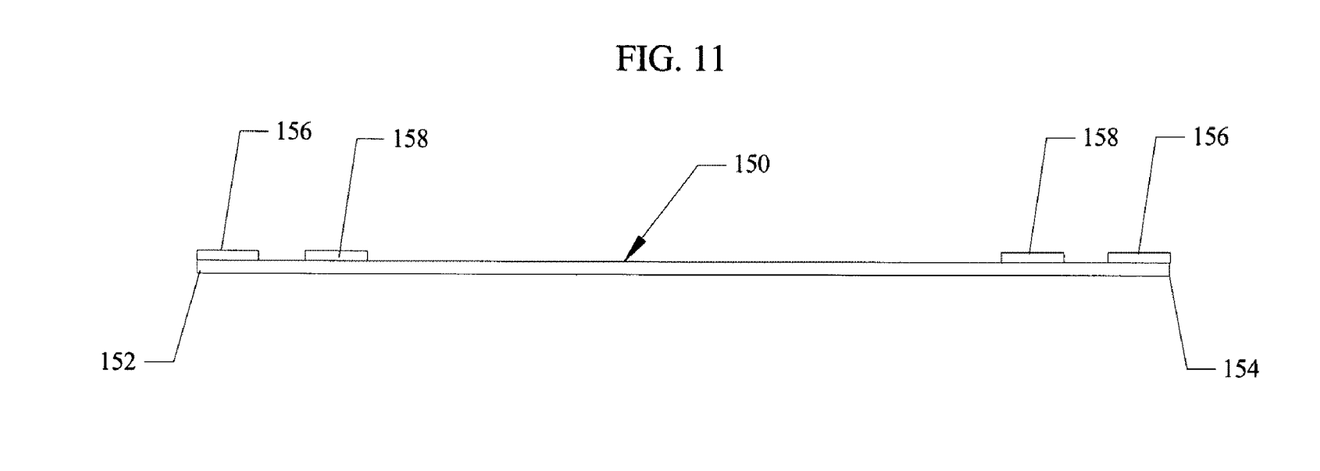
FIG. 11 is a cross sectional view of the extension strap of the kit of FIG. 9.

Referring now to FIGS. 8-11, some embodiments of the kit 100 include at least one extension strap 150 having a first end 152 and a second end 154. The extension strap 150 is preferably manufactured of the same material as straps 20, 30, is dimensioned to pass through the first strap 20 and the second strap and includes attachment means for attaching the extension strap 150 to at least one of the first strap 20 and the second strap 30. In the embodiment of FIG. 8, the extension strap 150 is adapted to pass through the first strap 20 and second strap 30 and for the first end 152 and a second end 154 to be joined together such that the extension strap form a loop. This embodiment of the extension strap 150 is shown in cross section in FIG. 10, which shows the first end 152, second end 154, male portion 156 of hook and loop fastener, and female portion 158 of hook and loop fastener. In the embodiment of FIG. 9, the extension strap 150 is adapted to attach to each of the first strap 20 and the second strap 30 and the first end 152 and second end 154 each include attachment means that allow them to be secured to the first strap 20 and second strap 30 respectively. This strap is shown in FIG. 11, which shows the first end 152, second end 154, two male portions 156 of hook and loop fastener, and two female portions 158 of hook and loop fastener. As shown in FIGS. 10 and 11, the attachment means is preferably hook and loop fastener. However, other embodiments utilize other attachment means, such as the D-rings and carabiners discussed above, snaps, buttons or other art recognized means for attaching two ends of a strap together.

The inclusion of an extension strap 150 with the kit 100 is preferred as it allow the person 300 using the device 10 to stand further away from the vehicle 400 than when the extension strap 150 is not used, which acts to prevent snow from the vehicle 400 from falling onto the person. Further, it allows users to more easily remove snow from the top large vehicles, such as sport utility vehicles. Finally, in embodiments of the kit 100 in which two devices are joined together, the use of two extension straps 150 allows each person to move away from the vehicle 400 while removing the snow therefrom.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A snow removal device for removing snow from a vehicle, said snow removal device comprising:
    a first sheet comprising a front surface and a back surface defined by a top edge, a bottom edge, a first side edge and a second side edge;
    a second sheet comprising a front surface and a back surface defined by a top edge, a bottom edge, a first side edge and a second side edge; and
    at least one strap comprising a first end and a second end;
    wherein said top edge, bottom edge, first side edge and second side edge of said first sheet are aligned with said top edge, bottom edge, first side edge and second side edge of said second sheet;
    wherein said top edge of said first sheet is joined to said top edge of said second sheet, said bottom edge of said first sheet is joined to said bottom edge of said second sheet, and said second sheet is further joined to said first sheet such that unjoined portions of said first sheet and said second sheet form an arm pocket and a weight pocket;
    wherein said arm pocket is formed proximate to said joined top edges of said first sheet and said second sheet and is dimensioned to accommodate an arm of a user;
    wherein said weight pocket is dimensioned to accommodate at least one weight and comprises at least three closed edges; and
    wherein said first end of said at least one strap is attached to said first sheet and said second sheet proximate to said joined top edges and said first side edge, and wherein said second end of said at least one strap is attached to said first sheet and said second sheet proximate to said joined bottom edges and said first side edge.

2. The snow removal device as claimed in claim 1 further comprising at least one weight disposed within said weight pocket.

3. The snow removal device as claimed in claim 2 wherein said at least one weight comprises a weight band comprising three weight compartments.

4. The snow removal device as claimed in claim 3 wherein said weight band comprises at least one pound of a weighting material in each of said three weight compartments.

5. The snow removal device as claimed in 3 wherein said weight band has a substantially triangular cross sectional shape and wherein a narrow edge of said weight band is disposed proximate to said joined bottom edges of said first sheet and said second sheet.

6. The snow removal device as claimed in claim 2 wherein said weight comprises a sealed bladder filled with a liquid material.

7. The snow removal device as claimed in claim 1 wherein said at least one strap comprises at least two straps;
    wherein a first of said least two straps is attached to said first sheet and said second sheet proximate to said joined top edges and said first side edge, and wherein said second end of said first of said at least two straps is attached to said first sheet and said second sheet proximate to said joined bottom edges and said first side edge; and
    wherein a second of said least two straps is attached to said first sheet and said second sheet proximate to said joined top edges and said second side edge, and wherein said second end of said second of said at least two straps is attached to said first sheet and said second sheet proximate to said joined bottom edges and said second side edge.

8. The snow removal device as claimed in claim 7 further comprising at least four attachment members;
    wherein one of said at least four attachment members is attached to said first sheet and said second sheet proximate to said joined top edges and said first side edge;
    wherein one of said at least four attachment members is attached to said first sheet and said second sheet proximate to said joined top edges and said second side edge;
    wherein one of said at least four attachment members is attached to said first sheet and said second sheet proximate to said joined bottom edges and said first side edge;
    wherein one of said at least four attachment members is attached to said first sheet and said second sheet proximate to said joined bottom edges and said second side edge;
    wherein at least one of said first end and said second end of said first strap is removably attached to one of said at least four attachment members; and
    wherein at least one of said first end and said second end of said second strap is removably attached to one of said at least four attachment members.

9. The snow removal device as claimed in claim 1 wherein said first sheet and said second sheet are manufactured of a water resistant fabric that will not scratch painted surfaces of said vehicle.

10. The snow removal device as claimed in claim 9 wherein said water resistant fabric is manufactured of a vinyl impregnated polyester yarn comprising a plurality of openings therethrough.

11. The snow removal device as claimed in claim 1 further comprising a plurality of reinforcing bands, wherein one reinforcing band is joined to said first sheet and said second sheet proximate to said top edges, one reinforcing band is joined to said first sheet and said second sheet proximate to said bottom edges, and one reinforcing band is joined to said first sheet and said second sheet between said arm pocket and said weight pocket.

12. A snow removal kit for removing snow from a vehicle, said snow removal kit comprising:
   a first snow removal device and a second snow removal device, wherein each of said first snow removal device and said second snow removal device comprises;
      a first sheet comprising a front surface and a back surface defined by a top edge, a bottom edge, a first side edge and a second side edge;
      a second sheet comprising a front surface and a back surface defined by a top edge, a bottom edge, a first side edge and a second side edge; and
      at least four attachment members;
      wherein said top edge, bottom edge, first side edge and second side edge of said first sheet are aligned with said top edge, bottom edge, first side edge and second side edge of said second sheet;
      wherein said top edge of said first sheet is joined to said top edge of said second sheet, said bottom edge of said first sheet is joined to said bottom edge of said second sheet, and said second sheet is further joined to said first sheet such that unjoined portions of said first sheet and said second sheet form an arm pocket and a weight pocket;
      wherein said arm pocket is formed proximate to said joined top edges of said first sheet and said second sheet and is dimensioned to accommodate an arm of a user;
      wherein said weight pocket is dimensioned to accommodate at least one weight and comprises at least three closed edges;
      wherein one of said at least four attachment members is attached to said first sheet and said second sheet proximate to said joined top edges and said first side edge;
      wherein one of said at least four attachment members is attached to said first sheet and said second sheet proximate to said joined top edges and said second side edge;
      wherein one of said at least four attachment members is attached to said first sheet and said second sheet proximate to said joined bottom edges and said first side edge; and
      wherein one of said at least four attachment members is attached to said first sheet and said second sheet proximate to said joined bottom edges and said second side edge;
   a first strap comprising a first end, a second end, a first clip member attached to said first end, and a second clip member attached to said second member, wherein said first clip member and said second clip member are dimensioned to removably attach to said attachment members of said first snow removal device;
   a second strap comprising a first end, a second end, a first clip member attached to said first end, and a second clip member attached to said second member, wherein said first clip member and said second clip member are dimensioned to removably attach to said attachment members of said first snow removal device; and
   joining means for removably joining said attachment members attached proximate to said second edge of said first snow removal device to said attachment members attached proximate to said first edge of said second snow removal device
   wherein said kit may be assembled by joining said attachment members attached proximate to said second edge of said first snow removal device to said attachment members attached proximate to said first edge of said second snow removal device using said joining means, attaching said first clip member of said first strap to said attachment member attached proximate to said top edge and said first edge of said first snow removal device, attaching said second clip member of said first strap to said attachment member attached proximate to said bottom edge and said first edge of said first snow removal device, attaching said first clip member of said second strap to said attachment member attached proximate to said top edge and said second edge of said second snow removal device, and attaching said second clip member of said second strap to said attachment member attached proximate to said bottom edge and said second edge of said second snow removal device.

13. The snow removal kit as claimed in claim 12 further comprising a first weight band dimensioned for disposal within said weight pocket of said first snow removal device and a second weight band dimensioned for disposal within said weight pocket of said second snow removal device.

14. The snow removal kit as claimed in claim 12 wherein said joining means comprises a first carabiner and a second carabiner.

15. The snow removal kit as claimed in claim 12 wherein said joining means is integrated into at least one of said first snow removal device and said second snow removal device and wherein said joining means comprises a first hook and loop fastener and a second hook and loop fastener;
   wherein said first hook and look fastener comprises a first portion that is attached to said joined top edge of said first sheet and said second sheet of one snow removal device proximate to one of said at least four attachment members and extends beyond said first side edge, and a second portion that is attached to said joined top edge of said first sheet and said second sheet;
   wherein said second hook and look fastener comprises a first portion that is attached to said joined bottom edge of said first sheet and said second sheet of one snow removal device proximate to one of said at least four attachment members and extends beyond said first side edge, and a second portion that is attached to said joined bottom edge of said first sheet and said second sheet;
   wherein said first portion of said first hook and loop fastener is of a length sufficient to allow said first portion of said first hook and loop fastener to pass through said attachment means attached proximate to said joined top edge of said other snow removal device and to mate with said second portion of said first hook and look fastener; and
   wherein said first portion of said second hook and loop fastener is of a length sufficient to allow said first portion of said second hook and loop fastener to pass through said attachment means attached proximate to said joined bottom edge and to mate with said second portion of said second hook and look fastener.

16. The snow removal kit as claimed in claim 12 further comprising at least one extension strap having a first end and a second end, wherein said at least one extension strap is dimensioned to pass through said first strap and said second strap and comprises attachment means for attaching extension strap to at least one said first strap and said second strap.

17. The snow removal kit as claimed in claim 12 further comprising a carrying pouch, wherein said carrying pouch is manufactured of a water resistant material and is dimensioned to accommodate said first snow removal device, said second snow removal device, said first strap, said second strap and said joining means.

18. A snow removal kit comprising:
   a snow removal device comprising;
      a first sheet comprising a front surface and a back surface defined by a top edge, a bottom edge, a first side edge and a second side edge;
      a second sheet comprising a front surface and a back surface defined by a top edge, a bottom edge, a first side edge and a second side edge; and
      at least four attachment members;
      wherein said top edge, bottom edge, first side edge and second side edge of said first sheet are aligned with said top edge, bottom edge, first side edge and second side edge of said second sheet;
      wherein said top edge of said first sheet is joined to said top edge of said second sheet, said bottom edge of said first sheet is joined to said bottom edge of said second sheet, and said second sheet is further joined to said first sheet such that unjoined portions of said first sheet and said second sheet form an arm pocket and a weight pocket;
      wherein said arm pocket is formed proximate to said joined top edges of said first sheet and said second sheet and is dimensioned to accommodate an arm of a user;
      wherein said weight pocket is dimensioned to accommodate at least one weight and comprises at least three closed edges;
      wherein one of said at least four attachment members is attached to said first sheet and said second sheet proximate to said joined top edges and said first side edge;
      wherein one of said at least four attachment members is attached to said first sheet and said second sheet proximate to said joined top edges and said second side edge;
      wherein one of said at least four attachment members is attached to said first sheet and said second sheet proximate to said joined bottom edges and said first side edge; and
      wherein one of said at least four attachment members is attached to said first sheet and said second sheet proximate to said joined bottom edges and said second side edge;
   a first strap comprising a first end, a second end, a first clip member attached to said first end, and a second clip member attached to said second member, wherein said first clip member and said second clip member are dimensioned to removably attach to said attachment members of said first snow removal device;
   a second strap comprising a first end, a second end, a first clip member attached to said first end, and a second clip member attached to said second member, wherein said first clip member and said second clip member are dimensioned to removably attach to said attachment members of said first snow removal device; and
   a weight band dimensioned for disposal within said weight pocket of said snow removal device.

19. The snow removal kit as claimed in claim 18 further comprising at least one extension strap having a first end and a second end, wherein said at least one extension strap is dimensioned to pass through said first strap and said second strap and comprises attachment means for attaching said extension strap to at least one of said first strap and said second strap.

20. The snow removal kit as claimed in claim 18 further comprising joining means for joining said snow removal device to another snow removal device.

* * * * *